United States Patent [19]

Hohner et al.

[11] Patent Number: 5,502,104
[45] Date of Patent: Mar. 26, 1996

[54] USE OF A COPOLYMER FOR THE PREPARATION OF AQUEOUS EMULSIONS

[75] Inventors: Gerd Hohner, Gersthofen; Franz-Leo Heinrichs, Gablingen; Jürgen Kainz, Neusäss, all of Germany

[73] Assignee: Hoechst Aktiengesellschaft, Germany

[21] Appl. No.: 195,780

[22] Filed: Feb. 14, 1994

[30] Foreign Application Priority Data

Feb. 12, 1993 [DE] Germany ............... 43 04 314.3

[51] Int. Cl.$^6$ .................................. C08L 39/00
[52] U.S. Cl. ............... 524/556; 524/560; 524/562; 526/318.45
[58] Field of Search ............... 524/556, 560, 524/562; 526/318.45

[56] References Cited

U.S. PATENT DOCUMENTS

| | | |
|---|---|---|
| 3,293,112 | 12/1966 | Kehr . |
| 3,756,999 | 9/1973 | Stetter . |
| 4,039,560 | 8/1977 | Tomoshige . |
| 4,406,705 | 9/1983 | Oeder . |
| 4,889,897 | 12/1989 | Schuster . |
| 4,996,259 | 2/1991 | Koehler et al. .................. 524/556 X |
| 5,292,794 | 3/1994 | Maginnis ................. 524/556 |
| 5,306,437 | 4/1994 | Heinrichs et al. ............. 526/318.45 X |

FOREIGN PATENT DOCUMENTS

| | | |
|---|---|---|
| 2084041 | 11/1991 | Canada . |
| 1129913 | 1/1985 | European Pat. Off. . |
| 0296490B1 | 6/1988 | European Pat. Off. . |
| 3109950A1 | 9/1932 | Germany . |
| 1495938 | 10/1963 | Germany . |
| 2035706 | 7/1970 | Germany . |
| 2241057C3 | 8/1972 | Germany . |
| 3044519 | 6/1982 | Germany . |
| 4139601 | 6/1993 | Germany . |
| 41 39 601 | 6/1993 | Germany . |

OTHER PUBLICATIONS

European Search Report, No. 94101796.4, Jun. 8, 1994.

*Primary Examiner*—Judy M. Reddick
*Attorney, Agent, or Firm*—Connolly & Hutz

[57] ABSTRACT

Copolymers which have been prepared by copolymerization of long-chain α-olefins with olefinically unsaturated acids and esters and, if appropriate, vinyl-aromatic compounds are particularly suitable for economical preparation of aqueous emulsions. The emulsions are suitable as care agents for flooring, automobiles, furniture and leather and for hydrophobizing, for treatment of textiles, for coating glass, for anticorrosive preservation, for example of automobiles, as facade protection and for sealing concrete.

2 Claims, No Drawings

USE OF A COPOLYMER FOR THE PREPARATION OF AQUEOUS EMULSIONS

DESCRIPTION

Use of a copolymer for the preparation of aqueous emulsions.

The invention relates to the use of copolymers, which have been prepared by copolymerization of long-chain α-olefins with olefinically unsaturated acids and esters and, if appropriate, vinyl-aromatic compounds, for the preparation of aqueous emulsions.

Aqueous emulsions of waxy substances have various uses, for example as care agents for flooring, for the care of shoes, furniture and automobiles, for treatment of textiles, as hydrophobizing agents and the like. In addition to auxiliaries and additives such as emulsifiers, wetting agents and the like, such emulsions also as a rule comprise, as the essential active substance—if appropriate in addition to high molecular weight polymers—polar waxes which usually carry carboxyl groups. Both fully synthetic products, as a rule based on polyethylene, and waxes on a natural basis are suitable. The former are accessible by melt oxidation of non-polar hydrocarbon waxes, for example polyethylene waxes (cf. DE 22 41 057), or by oxidative degradation of high molecular weight polyethylene (cf. DE 20 35 706, DE 14 95 938 and EP 296 490). The preparation of such oxidation products causes a high technical expenditure, since, in a two-stage process, wax- or plastic-like hydrocarbon polymers are first prepared and these then have to be degraded oxidatively to give a product which contains carboxyl groups and is suitable for the emulsification.

Fully synthetic emulsifiable waxes furthermore are accessible in a one-stage reaction by free radical copolymerization of olefin hydrocarbons, usually ethylene, with polar comonomers, for example olefinically unsaturated carboxylic acids (cf. DE 30 44 519), or by terpolymerization with unsaturated acids and esters thereof (cf. DE 31 09 950). The polymerization process requires high pressures and temperatures and must be carried out in corrosion-resistant apparatuses.

The montan waxes may be mentioned as an example of emulsifiable waxes on a natural basis. These are obtained by solvent extraction from wax-rich lignite and subsequent refinement of the extracts, comprising deresinification, bleaching and esterification steps. The technical expenditure necessary for this is considerable.

The object was to provide emulsifiable waxes which are suitable for the abovementioned uses and can be prepared by a simple, economical process.

The waxes used for the emulsions according to the invention are copolymers of alpha-olefins, unsaturated carboxylic acids, unsaturated carboxylic acid esters and, if appropriate, other comonomers of the styrene type. Such waxes are known (cf. DE 41 39 601) and comprise 20 to 99% by weight of units which are derived from $C_{12}$–$C_{60}$-α-olefins, 1 to 30% by weight of units which are derived from one or more carboxylic acid(s) of the formula $CH_2=CR^1-COOH$, 0 to 60% by weight of units which are derived from one or more carboxylic acid ester(s) of the formula

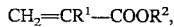

in which, in these formulae, $R^1$ is a hydrogen atom or a methyl group and $R^2$ is a straight-chain or branched alkyl radical having 1 to 22 carbon atoms, and 0 to 30% by weight of units which are derived from styrene, 3-methylstyrene, 4-methylstyrene or α-methylstyrene.

Possible α-olefins are those having a chain length of 12 to 60, preferably 18 to 60, particularly preferably 24 to 60 carbon atoms. Both pure-chain olefins and olefin mixtures such as are obtained, for example, as distillation cuts or distillation residues by known preparation processes, can be employed. Industrial α-olefin mixtures, in particular those of relatively high chain length, can contain, in addition to 1-alkenes, greater or lesser amounts of internal or lateral olefinic double bonds (vinylene and vinylidene groups). Compounds of the formula $CH_2=CR^1-COOH$ in which $R^1$ is a hydrogen atom or a methyl group, i.e. acrylic or methacrylic acid, are employed according to the invention as unsaturated carboxylic acids. Compounds of the formula $CH_2=CR^1COOR^2$ in which $R^1$ has the above meaning and $R^2$ is a straight-chain or branched alkyl radical having 1 to 22 carbon atoms are used as unsaturated carboxylic acid esters. The methyl and ethyl esters of acrylic and methacrylic acid are preferred, and the methyl ester of acrylic acid is particularly preferred. Styrene, 3-methylstyrene, 4-methylstyrene or α-methylstyrene, preferably styrene, can be employed as vinylaromatic compounds. It is also possible to use several of the carboxylic acids, carboxylic acid esters and, if appropriate, styrenes mentioned.

The waxes to be used according to the invention are prepared by reacting the starting monomers under the catalytic action of small amounts of organic peroxides.

The copolymers are used for the preparation of aqueous emulsions. The emulsions are prepared in a known manner by stirring the copolymers with water at temperatures above the melting point of the wax. The emulsions can be prepared under normal pressure, in a low-pressure autoclave or by means of a high-pressure homogenizing machine. The usual preparation processes are the following:

In the first method of the "water-in-wax process", the copolymer and the substances which are possibly also to be emulsified are melted in a container heated with steam. The emulsifiers or hydrolyzing agents are added at about 110° C. Cationic emulsifiers are neutralized beforehand with the necessary amount of acid. The most favorable temperature for the hydrolysis and emulsification depends on the particular recipe and must be determined by experiments. Boiling water is gradually stirred into the melt in amounts which are so small that the steam formed during the emulsification can be precipitated by the condenser without residue. The mixture is then cooled and filtered.

In the second method of the "water-in-wax process", the raw materials are prepared for emulsification as above. The amount by weight of boiling water corresponding to the wax/emulsifier mixture is then added as far as possible all at once, so that an approximately 50% strength concentrated emulsion forms. The contents of the container are cooled to 85° to 90° C. and diluted with the remainder of the water, while stirring.

In the "wax-in-water process", waxes and emulsifiers are heated at about 120° to 130° C. in a melting container. The envisaged amount of water is heated to the emulsifying temperature in a second container. The wax melt is then stirred into the water, initially introduced into the second container, in a thin stream. When the addition of wax has ended, the emulsion is cooled to room temperature and filtered.

For emulsification in a low-pressure autoclave, all the raw materials are introduced into the pressure vessel at room temperature and this vessel is closed. The contents of the vessel are then heated to the temperature envisaged for the particular recipe and heated for about 45 minutes, while stirring.

Finally, emulsification by means of a high-pressure homogenizing machine is also possible. For this, the water is heated in a preliminary stirred container, all the constituents of the emulsion to be prepared are added and the entire mixture is mixed intensively and pumped into the homogenizing machine. The pressure is about 50 to 100 bar. The emulsion which emerges from the homogenizing machine is cooled continuously to room temperature and filtered.

In addition to the copolymer, the emulsions comprise the customary auxiliaries, such as, for example, ionic and/or nonionic emulsifiers, other waxes, paraffins and the like. Furthermore, it is possible to admix other customary components for optimization of the use technology properties, such as, for example, substances having a cleaning action, solvents, such as, for example, isopropanol or white spirit in amounts of up to about 95% by weight, flow control and wetting agents, such as, for example, modified maleate resins in amounts of about 5 to 15% by weight, polymer dispersions, such as, for example, metal salt-containing or metal salt-free acrylate or acrylate/styrene copolymer dispersions in amounts of about 10 to 90% by weight, foam suppressants, such as, for example, polysiloxane/polyether copolymers or silicone oils in amounts of up to about 0.03% by weight, film-forming additives, such as, for example, fluorine surfactants in amounts of up to about 0.05% by weight, antistatics, such as, for example, organic phosphoric acid esters in amounts of up to about 0.7% by weight, bactericides, preservatives, for example 1,2-benzisothiazolin-3-one in amounts of up to about 0.3% by weight, dyestuffs, such as, for example, fluorescein in amounts of up to about 0.03% by weight, fragrances, such as, for example, lemon oil or orange terpene in amounts of up to about 0.7% by weight, corrosion inhibitors, such as, for example, nitrogen-containing boric acid derivatives, in amounts of up to about 8% by weight, and the like.

It is advantageous that, because of the low melting points of the copolymer waxes, the emulsification can be carried out at a temperature below 100° C. without applying pressure.

The emulsions are suitable, for example, as care agents for flooring, automobiles, furniture and leather and for hydrophobizing, for treatment of textiles, for coating glass, for anticorrosive preservation, for example of automobiles, as facade protection and for sealing concrete.

The following examples are intended to illustrate the invention.

EXAMPLES 1 TO 10

The copolymer waxes employed for formulation of the emulsions according to the invention and listed in Table 1 were prepared in accordance with the following instructions:

500 g of a commercially available $C_{24}C_{60}$ α-olefin cut were initially introduced into a five-necked flask fitted with a thermometer, stirrer, dropping funnel and reflux condenser and were heated to 140° C. A mixture of methyl acrylate, acrylic acid and 5.0 g of di-t-butylperoxide (for copolymer waxes 1 to 5, 8 and 9) or a mixture of methyl acrylate, acrylic acid, methyl methacrylate and 5.0 g of di-t-butyl peroxide (copolymer wax 6) or a mixture of methyl acrylate, acrylic acid, styrene and 5.0 g of di-t-butyl peroxide (copolymer wax 7) or a mixture of acrylic acid and 5.0 g of di-t-butyl peroxide (copolymer wax 10) was added dropwise at this temperature in the course of 5 hours, while stirring. When the dropwise addition had ended, the mixture was allowed to after-react for a further 30 minutes and the volatile constituents were distilled off in vacuo under about 15 mbar at a bath temperature of 170° C. The colorless reaction product, which solidifies in waxy form, was poured into dishes. The composition of the waxes and the physical data are listed in Table 1.

TABLE 1

| Copolymer wax No. | 1 | 2 | 3 | 4 | 5 | 6 | 7 | 8 | 9 | 10 | 11 |
|---|---|---|---|---|---|---|---|---|---|---|---|
| Acrylic acid % by weight | 2.1 | 2.2 | 2.1 | 2.2 | 2.1 | 2.1 | 2.1 | 4.2 | 2.3 | 16.7 | 2.3 |
| Methyl acrylate % by weight | 20.0 | 25.4 | 33.0*) | 23.0 | 20.0 | 10.0 | 18.2 | 21.5 | 28.0 | — | 30.0 |
| Me methacrylate % by weight | — | — | — | — | — | 10.0 | — | — | — | — | — |
| Styrene % by weight | — | — | — | — | — | — | 9.1 | — | — | — | — |
| Acid number mg of KOH/g | 16 | 15 | 16 | 17 | 16 | 16 | 16 | 31 | 17 | 123 | 16 |
| Dr. pt. °C. | 70 | 71 | 69 | 71 | 73 | 74 | 71 | 70 | 71 | 73 | 71 |

*)Ethyl acrylate

The acid numbers and drop points were determined in accordance with the DGF standard methods M-IV 2 (57) and M-III 3 (75) (Standards of the Deutsche Gesellschaft für Fettwissenschaft [German Society of Fat Science] e.V.).

The abovementioned copolymer waxes were emulsified, using the recipes shown in Table 2, in accordance with the following procedure:

The emulsifier and KOH were stirred into a melt of the wax at about 120° C. the mixture was poured in a thin stream into hot water (85° C.), while stirring, and the mixture was then rapidly cooled to room temperature in a water-bath. In Examples 9 and 11, the emulsifier was neutralized with the stated amount of glacial acetic acid before being stirred into the wax melt.

In Example 8, the wax and emulsifier were melted at 105° C., boiling water was added in portions, and the mixture was boiled up and cooled in a water-bath, while stirring.

TABLE 2

| Copolymer wax | 1 | 2 | 3 | 4 | 5 | 6 | 7 | 8 | 9 | 10 | 11 |
|---|---|---|---|---|---|---|---|---|---|---|---|
| Emulsion type | i./ni. | i./ni. | i./ni. | i./ni. | i./ni. | i./ni. | i./ni. | ni. | c. | i./ni. | c. |
| Wax [%[1]] | 12.1 | 27.1 | 26.4 | 26.3 | 22.5 | 22.5 | 22.5 | 10.2 | 24.6 | 20.1 | 24.6 |
| Emulsifiers [%] | 2.0 (A) 1.0 (B) 0.5 (C) | 1.6 olein 2.6 (D) 2.6 (E) 1.9 (F) 2.1 (G)[2)] | 1.6 olein 2.6 (D) | 7.9 (H) 0.7 (B) 2.6 (D) | 6.8 (H) | 6.8 (I) | 6.8 (H) | 1.8 (K) | 4.9 (L) | 3.6 (M) 1.6 (B) 0.8 (F) | 4.9 (L) |
| Additives [%[1]] | 0.5 KOH 21.5% strength | 2.2 KOH 43% strength | 2.2 KOH 43% strength | 0.7 KOH 43% strength | 0.4 KOH 43% strength | 0.4 KOH 43% strength | 0.4 KOH 43% strength | — | 1.1 glacial acetic acid | 6.9 KOH | 1.1 glacial acetic acid |
| Water desalinated [%[1]] | 83.8 | 63.9 | 65.2 | 65.1 | 70.3 | 70.3 | 70.3 | 88 | 69.4 | 67 | 69.4 |
| Properties of the emulsion: | | | | | | | | | | | |
| Transparency to light [%[3]] | 64 | 76 | 85 | 90 | 89.9 | 88.7 | 90.8 | — | 12 | — | 79.4 |
| Run-off on glass | clear | clear | clear | clear | clear | homogeneous | clear | homogeneous | clear | homogeneous | clear |
| Visual gloss | dark/shiny | dark/shiny | dark/shiny | dark/shiny | dark/shiny | silk/matt | dark/shiny | silk/matt | dark/shiny | matt | milky/shiny |
| Measurement[4)] | 62/80 | 58/77 | 55/78 | 23/71 | 79/87 | 1.3/1.7 | 82/88 | 0.3/0.6 | 54/76 | — | 30/62 |
| Consistency after storage at 50° C. | thinly mobile (2 weeks) | thinly mobile (2 weeks) | thinly mobile (3 weeks) | thinly mobile (1 week) | thinly mobile (1 week) | thinly mobile (3 weeks) | thinly mobile (3 weeks) | thinly mobile (3 weeks | thinly mobile (3 weeks) | — | thinly mobile (3 weeks) |

Legend to Table 2
i./ni. = ionic/nonionic; c. = cationic?
[1)]based on the total emulsion
[2)]stirred into the finished mixture
[3)]transparency meter according to Dr. Lange, measuring head LT 12, 0.1% strength solution, 0.2 cm cell, broad band green filter VG 9, water, desalinated
[4)]micro-TRI-gloss meter from Byk Gardner GmbH, measurement angle 20/60°
Emulsifiers used:
(A) oleic acid sarcoside Na salt
(® Arkomon A 60%, Hoechst AG)
(B) fatty alcohol polyglycol ether
(® Genapol C 050, Hoechst AG)
(C) fatty acid monoethanolamide polyglycol ether
(® Genagen CA 050, Hoechst AG)
(D) ether carboxylic acid
(® Akypo RLM 38 90%, ChemY Chem. Fabr. GmbH)
(E) coconut fatty acid monoethanolamide + 8 mol of EO
(® Emulgin C 8, Henkel KG&A)
(F) coconut fatty acid monoethanolamide + 4 mol of EO
(® Emulgin C 4)
(G) $C_{11}$ oxo alcohol polyglycol ether
(® Genapol UD 110 35%)
(H) stearylamine ethoxylate
(® Genamine S 100, Hoechst AG)
(I) stearylamine ethoxylate
® Genamine S 150)
(K) fatty alcohol polyglycol ether
(® Genapol O 230)
(L) fatty acid amidoamine
(® Tegotain S 18, Th. Goldschmidt AG)
(M) oleic acid sarcoside
(® Arkomon SO)

EXAMPLE 12

Preparation of a Self-Gloss Emulsion 70 parts of the emulsion described in Table 2 under Experiment No. 5 were mixed with 30 parts of a commercially available acrylate copolymer dispersion (®Licomer A 53, 15%, Hoechst AG), 1.5 parts of ethyldiglycol, 0.5 part of tributoxyethyl phosphate, 1.0 part of fluorine surfactant (®Licowet Fl (1%), Hoechst AG) and 0.1 part of a mixture of methylchloroisothiazolinone and methylisothiazolinone (®Mergal K 7, Riedel de Haen AG). The resulting self-gloss emulsion was stable, displayed an outstanding self-gloss, coupled with a good resistance to detergents and water, when applied to floor coverings, and was easy to remove when cleaning agents were used. The films were non-slip and accumulated only a little dirt.

EXAMPLE 13

Preparation of a Self-Gloss Emulsion 7.8 parts of the emulsion described in Table 2 under Experiment No. 5 were mixed with 37.4 parts of a commercially available metal salt-containing polymer dispersion (®Licomer M 55, 38%, Hoechst AG), 4.3 parts of tributoxyethyl phosphate, 5.0 parts of modified maleate resin (®Alresat 640° C., 20%, Hoechst AG), 1.0 part of oxo alcohol polyglycol ether (®Genapol OX 060, Hoechst AG), 1.0 part of fluorine surfactant (®Licowet F1, 1%, Hoechst AG), 0.1 part of ammonia solution (25% strength) and 43.3 parts of desalinated water. The resulting self-gloss emulsion was stable and clear/homogeneous, displayed an outstanding self-gloss, coupled with a good resistance to detergents and water, when applied to floor coverings, and was easy to remove when cleaners were used. The films were non-slip and accumulated only a little dirt.

EXAMPLE 14

Preparation of a Furniture Polish 47.0 parts of the emulsion described in Table 2 under No. 11 were diluted with 66.0 parts of water and then mixed with 30.0 parts of white spirit, 2.5 parts of a commercially available alkyl polyglycol ether (®Emulsogen LP, Hoechst AG), 0.5 part of a commercially available organic phosphoric acid ester (®Hostphat KL 340 N, Hoechst AG) and 20.0 parts of a commercially available silicone emulsion (E 10, Wacker Chemie GmbH) and the mixture was stirred for one hour. The resulting emulsion displayed good polishing properties and good gloss when applied to the surface of furniture.

EXAMPLE 15

Preparation of a Solvent-Free Automobile Polish 5.5 parts of the copolymer wax described in Table 1 under No. 11 were heated at 80° C. together with 0.5 part of industrial stearic acid, 1.1 parts of a commercially available fatty acid amidoamine emulsifier (®Tegotain S 18, Th. Goldschmidt AG), 4.0 parts of silicone oil AK 350, 0.5 part of silicone oil AK 12500 and 1.0 part of silicone oil L 654 (all from Wacker Chemie GmbH), and 20.0 parts of $C_{10}$–$C_{13}$ n-paraffin. 0.5 part of glacial acetic acid was stirred into the mixture. The mixture was then allowed to cool to room temperature and a mixture of 0.5 part of aluminum silicate (®Kaopolite SF, Gesellschaft für RohstoffveredlungmbH), 0.5 part of industrial glycerol and 64.0 parts of water was stirred in. The stable, viscous polish displayed good polishing properties and good gloss after application to automobile sheet metal.

We claim:

1. An aqueous emulsion comprising
  I) 1 to 35% by weight of a copolymer comprising
    a) at least 20% by weight of units which are derived from at least one $C_{12}$–$C_{60}$-α-olefin,
    b) 1 to 30% by weight of units which are derived from at least one carboxylic acid of the formula $CH_2$=$CR^1$—COOH,
    c) 18.2 to 60% by weight of units which are derived from at least one carboxylic acid ester of the formula $CH_2$=$CR^1$—COOR$^2$,
  in which $R^1$ is a hydrogen atom or a methyl group, and $R^2$ is a straight chain or branched alkyl radical having 1 to 22 carbon atoms, and
    d) 0 to 30% by weight of units which are derived from styrene, 3-methylstyrene, 4-methylstyrene, or α-methylstyrene,
  II) 1 to 30% by weight of an emulsifier, and
  III) 50 to 98% by weight of water.

2. An aqueous emulsion as claimed in claim 1, wherein the carboxylic acid units of the formula $CH_2$=$CR^1$—COOH are present in an amount of from 2.1 to 16.7% by weight.

* * * * *